United States Patent
Itoh et al.

(10) Patent No.: US 7,730,444 B2
(45) Date of Patent: Jun. 1, 2010

(54) STRUCTURAL ANALYSIS METHOD EMPLOYING FINITE ELEMENT METHOD

(75) Inventors: Nobutaka Itoh, Kawasaki (JP); Tetsuyuki Kubota, Kawasaki (JP); Mami Nakadate, Kawasaki (JP); Akira Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 599 days.

(21) Appl. No.: 11/259,272

(22) Filed: Oct. 27, 2005

(65) Prior Publication Data

US 2006/0173660 A1 Aug. 3, 2006

(30) Foreign Application Priority Data

Jan. 31, 2005 (JP) ............... 2005-023463

(51) Int. Cl.
*G06F 17/50* (2006.01)
*H03K 17/693* (2006.01)

(52) U.S. Cl. ............... 716/20; 716/2; 716/4; 716/15

(58) Field of Classification Search ............ 716/2, 716/4, 15, 20
See application file for complete search history.

(56) References Cited

U.S. PATENT DOCUMENTS

2003/0196181 A1* 10/2003 Sano et al. ............... 716/4
2004/0210425 A1* 10/2004 Aoki et al. ............... 703/1
2005/0008319 A1* 1/2005 Cameron ............... 385/145
2005/0246669 A1* 11/2005 Yamazaki ............... 716/5

FOREIGN PATENT DOCUMENTS

| JP | 09-218032 | 8/1997 |
| JP | 10-093206 | 4/1998 |
| JP | 2000-231579 | 8/2000 |
| JP | 2004-013437 | 1/2004 |

* cited by examiner

*Primary Examiner*—Jack Chiang
*Assistant Examiner*—Suresh Memula
(74) *Attorney, Agent, or Firm*—Staas & Halsey LLP

(57) ABSTRACT

A structural analysis method that saves analysis time without lowering the prediction accuracy is provided. The structural analysis method has dividing up the analysis target into a plurality of finite elements; defining a plurality of meshes that divide up the analysis target into units larger than the finite elements and calculating, for each mesh, the proportion of one material among the plurality of materials that occupy the finite element contained in the mesh; specifying a mesh in which the calculated proportion of the one material exceeds a predetermined threshold value and generating mesh data by substituting material information specifying materials other than the one material with material information of the materials of the finite elements contained in the specified mesh; and calculating the physical amount yielded in the analysis target on the basis of the generated mesh data.

15 Claims, 14 Drawing Sheets

Fig.5

| POSITIONAL INFORMATION | THICKNESS |
|---|---|
| x1、y1 | TP1 |
| x2、y2 | TP2 |
| ... | ... |

ELEMENT DIVISION DATA

| ELEMENT ID | LAYER NUMBER | FIRST NODE | ... | EIGHTH NODE | MATERIAL |
|---|---|---|---|---|---|
| 1 | 1 | x11,y11,z11 | ... | x18,y18,z18 | M1 |
| 2 | 1 | x21,y21,z21 | ... | x28,y28,z28 | M2 |
| 3 | 1 | x31,y31,z31 | ... | x38,y38,z38 | M2 |
| 4 | 1 | x41,y41,z41 | ... | x48,y48,z48 | M3 |
| ... | ... | ... | ... | ... | ... |

Fig. 10

MESH DATA

| MESH ID | LAYER NUMBER | CORRESPONDING ELEMENT LIST | FIRST NODE | ... | FOURTH NODE | CONDUCTOR CONTENT | MATERIAL |
|---|---|---|---|---|---|---|---|
| 1 | 1 | E1 | Mx11, My11 | ... | Mx14, My14 | P1 | M1 |
| 2 | 1 | E2 | Mx21, My21 | ... | Mx24, My24 | P2 | M1 |
| 3 | 1 | E3 | Mx31, My31 | ... | Mx34, My34 | P3 | M2 |
| 4 | 1 | E4 | Mx41, My41 | ... | Mx44, My44 | P4 | M3 |
| ... | ... | ... | ... | ... | ... | ... | ... |

Fig.12

STACKED LAYER SHELL DATA

| TWO-DIMENSIONAL MESH ID | FIRST NODE | ... | FOURTH NODE | MATERIAL AND THICKNESS LIST |
|---|---|---|---|---|
| 1 | Mx11, My11 | ... | Mx14, My14 | (M1:T11, M2:T12, M3:T13) |
| 2 | Mx21, My21 | ... | Mx24, My24 | (M1:T21, M3:T23) |
| 3 | Mx31, My31 | ... | Mx34, My34 | (M2:T32, M1:T31) |
| 4 | Mx41, My41 | ... | Mx44, My44 | (M1:T41, M2:T42, M3:T43) |
| ... | ... | ... | ... | ... |

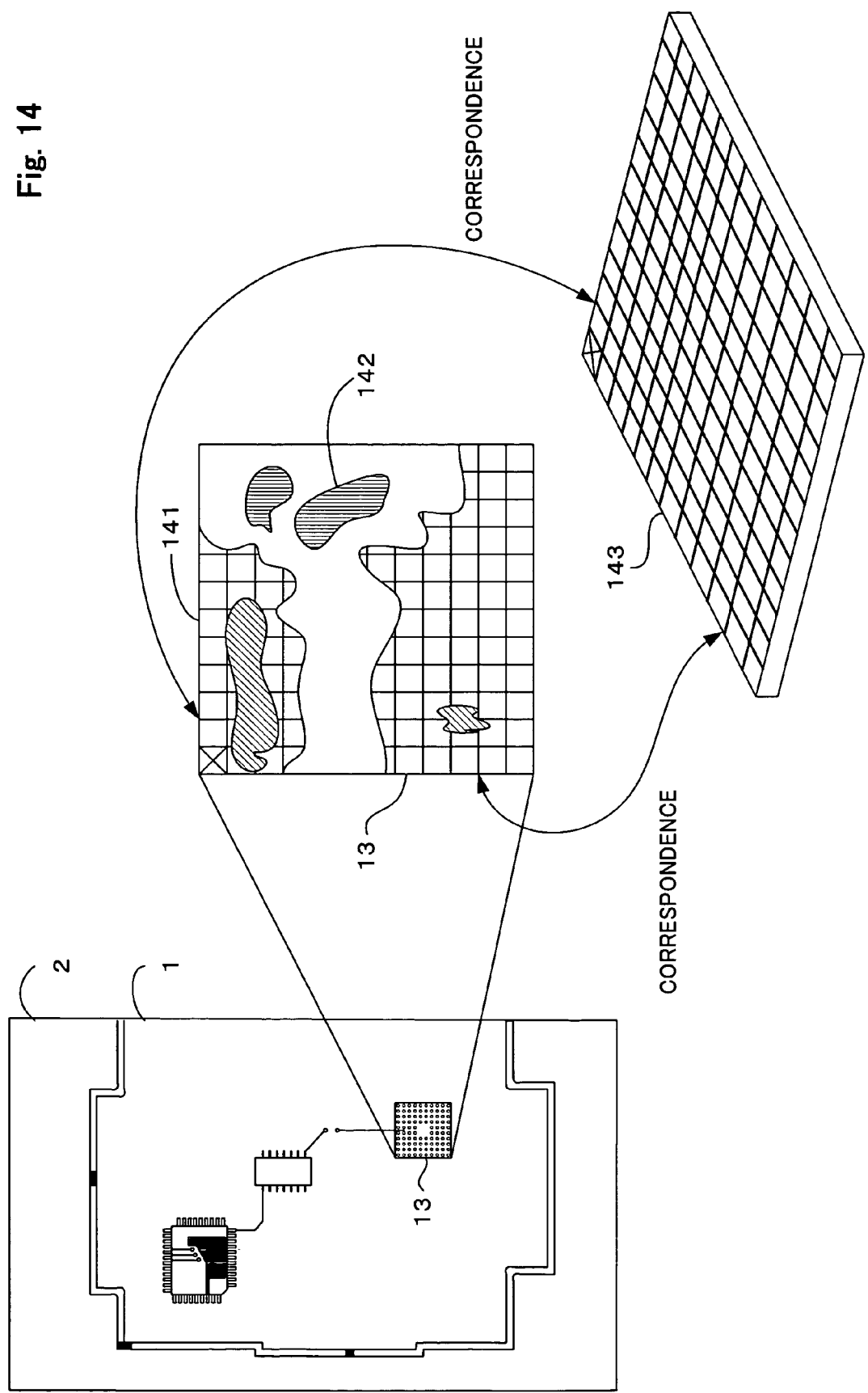

STRUCTURAL ANALYSIS METHOD EMPLOYING FINITE ELEMENT METHOD

CROSS-REFERENCE TO RELATED APPLICATIONS

This application is based upon and claims benefit of priority from the prior Japanese Patent Application No. 2005-023463, filed on Jan. 31, 2005, the entire contents of which are incorporated herein by reference.

BACKGROUND OF THE INVENTION

1. Field of the Invention

The present invention relates to a structural analysis method employing the finite element method and, more particularly, to a structural analysis method to analyze a structural characteristic of a printed wiring substrate (strain characteristic, stress characteristic, thermal conduction characteristic, for example) by means of a numerical value simulation that employs a computer and refers to an associated program and structural analysis device.

2. Description of the Related Art

A printed wiring substrate on which an integrated circuit pattern is formed by using the mask technology shown in Japanese Patent Application Laid Open No. H9-218032 is employed as the motherboard of an electronic device. Warpage is produced in the printed wiring substrate in accordance with the temperature conditions of the reflow process for mounting the electronic part (LSI: Large Scale Integration, for example). The warpage that occurs as a result of the conditions of the fabrication process causes non-arrival or a shortage of the bump join portions or the like of an electronic part that is mounted on the surface of the printed wiring substrate, whereby the product yield is reduced.

Therefore, the combination of CAD (Computer Aided Design) and the finite element method to structurally analyze the printed wiring substrate and predict the warpage that is produced in the printed wiring substrate as a result of the conditions of the fabrication process is known (Japanese Patent Application Nos. 2004-13437 and 2000-231579, and U.S. Pat. No. 3,329,667). As a result of this prediction, design modifications can be implemented to produce a printed wiring substrate with minimal warpage in the mounting process.

SUMMARY OF THE INVENTION

However, with the conventional technology, when the printed wiring substrate being the analysis target of the structural analysis is divided up into finite elements, the number of divisions must be increased in order to raise the prediction accuracy. As a result, the data count is enormous and the prediction computation takes time. Conversely, when the number of divisions is reduced, there is the problem that the prediction accuracy drops.

Accordingly, the object of the present invention is to provide a structural analysis method, structural analysis program, and structural analysis device that shorten the structural analysis time without lowering the prediction accuracy.

The above object is achieved by providing, as a first aspect of the present invention, a structural analysis method that is executed by a structural analysis device that performs a structural analysis of an analysis object that is formed from a plurality of materials with different physical properties, comprising a step in which the structural analysis device generates, upon dividing up the analysis target into a plurality of finite elements, element division data that associates positional information specifying the position of the finite element and material information specifying the material of the finite element, for each of the finite elements; a step in which the structural analysis device defines a plurality of meshes that divide up the analysis target into units larger than the finite elements by means of positional information and calculates, for each mesh, the proportion of one material among the plurality of materials that occupy the finite element contained in the mesh on the basis of the element division data; a step in which the structural analysis device specifies a mesh in which the proportion of the calculated one material exceeds a predetermined threshold value and generates, for the material information of the element division data, mesh data by rewriting, of the materials of the finite elements contained in the specified mesh, material information specifying materials other than the one material with material information specifying the one material; and a step in which the structural analysis device calculates the physical amount yielded in the analysis target on the basis of the mesh data thus generated.

A preferred embodiment of the above aspect of the invention further comprises a step in which the structural analysis device calculates a first proportion of the one material occupying the analysis target that is calculated on the basis of the element division data and a second proportion of the one material occupying the analysis target that is calculated on the basis of the generated mesh data; and a step in which the structural analysis device regenerates the mesh data by changing the predetermined threshold value when the first and second proportions do not lie within a predetermined error range.

According to a preferred embodiment of the above aspect of the invention, a plurality of layers is formed in the analysis target according to the division into the finite elements, the structural analysis method further comprising a step in which the structural analysis device extracts, for each of the layers, the position corresponding with a predetermined region of the surface of the analysis target, wherein the mesh is defined with respect to the extracted position.

According to a preferred embodiment of the above aspect of the present invention, a plurality of layers is formed in the analysis target according to the division into the finite elements, the structural analysis method further comprising: a step in which the structural analysis device calculates, for each of the layers, the proportion of the one material occupying the analysis target on the basis of the generated mesh data; and a step in which the structural analysis device changes, in the layer in which the proportion of the one material thus calculated exceeds a high density reference value, material information of a predetermined finite element contained in the mesh data to material information of a material other than the one material among a plurality of materials forming the analysis target and performs an adjustment so that the proportion of the one material calculated for each of the layers lies within a predetermined error range.

According to a preferred embodiment of the above aspect of the present invention, the structural analysis method further comprises a step in which the structural analysis device generates new mesh data when a member that is added to a predetermined region of the surface of the analysis target is a new analysis target, wherein the mesh position of the added member and the mesh position of the predetermined region of the surface of the analysis target receiving the added member match.

According to a preferred embodiment of the above aspect of the present invention, the structural analysis method further comprises a step in which the mesh positional information is specified by means of three-dimensional coordinates rendered by combining two-dimensional coordinates formed on the surface of the analysis target and the position in a thickness direction that is orthogonal to the surface; and a step in which, by specifying successive sections of the same material in the thickness direction of the mesh with the same two-dimensional coordinates, the structural analysis device generates, on the basis of the mesh data, stacked layer shell data associating the material information of the successive material and the thickness of the successive material with the mesh positional information, wherein the physical amount yielded in the analysis target is calculated on the basis of the stacked layer shell data.

According to a preferred embodiment of the above aspect of the present invention, a plurality of layers is formed in the analysis target according to the division into the finite elements and the structural analysis device comprising a storage portion for pre-storing thickness data that associates the position of the surface of the analysis target and the thickness in the layer direction of the analysis target of the multi-layered structure, the structural analysis method further comprising a step in which the structural analysis device updates the mesh data on the basis of the thickness data.

Furthermore, the above object is achieved by providing, as a second aspect, a program allowing a computer that performs a structural analysis of an analysis target formed by a plurality of materials with different physical characteristics to execute: means for generating, upon dividing up the analysis target into a plurality of finite elements, element division data that associates positional information specifying the position of the finite element and material information specifying the material of the finite element, for each of the finite elements; means for defining a plurality of meshes that divide up the analysis target into units larger than the finite elements by means of positional information and calculating, for each mesh, the proportion of one material among the plurality of materials that occupy the finite element contained in the mesh on the basis of the element division data; means for specifying a mesh in which the proportion of the calculated one material exceeds a predetermined threshold value and generating, for the material information of the element division data, mesh data by rewriting, of the materials of the finite elements contained in the specified mesh, material information specifying materials other than the one material with material information specifying the one material; and means of calculating the physical amount yielded in the analysis target on the basis of the mesh data thus generated.

Further, the above object is achieved by providing, as a third aspect, a structural analysis device that performs a structural analysis of an analysis target formed from a plurality of materials with different characteristics, comprising: a storage portion comprising a control program; and a control unit that reads and executes the control program, wherein the control unit implements, by executing the control program, a first generation portion that generates, upon dividing up the analysis target into a plurality of finite elements, element division data that associates positional information specifying the position of the finite element and material information specifying the material of the finite element, for each of the finite elements; a first calculation portion that defines a plurality of meshes that divide up the analysis target into units larger than the finite elements by means of positional information and calculates, for each mesh, the proportion of one material among the plurality of materials that occupy the finite element contained in the mesh on the basis of the element division data; a second generation portion that specifies a mesh in which the proportion of the calculated one material exceeds a predetermined threshold value and generates, for the material information of the element division data, mesh data by rewriting, of the materials of the finite elements contained in the specified mesh, material information specifying materials other than the one material with material information specifying the one material; and a second calculation portion that calculates the physical amount yielded in the analysis target on the basis of the mesh data thus generated.

BRIEF DESCRIPTION OF THE DRAWINGS

FIG. 5 shows an example of the data composition of a thickness table;

FIG. 8 illustrates an aspect for generating mesh data, where

FIG. 10 is an example of the data composition of mesh data;

FIG. 12 is an example of the data composition of stacked layer mesh data;

FIG. 14 illustrates an aspect for performing structural analysis by extracting part of the printed wiring substrate.

DESCRIPTION OF THE PREFERRED EMBODIMENTS

Embodiments of the present invention will be described below with reference to the drawings. However, the technological scope of the present invention is not limited to this embodiment but, rather, covers the inventions appearing in the claims and any equivalents thereof.

According to the embodiment of the present invention, a printed wiring substrate is used as the analysis target. Therefore, a print wiring substrate that is used in this embodiment is first simply touched on.

Figure 1:
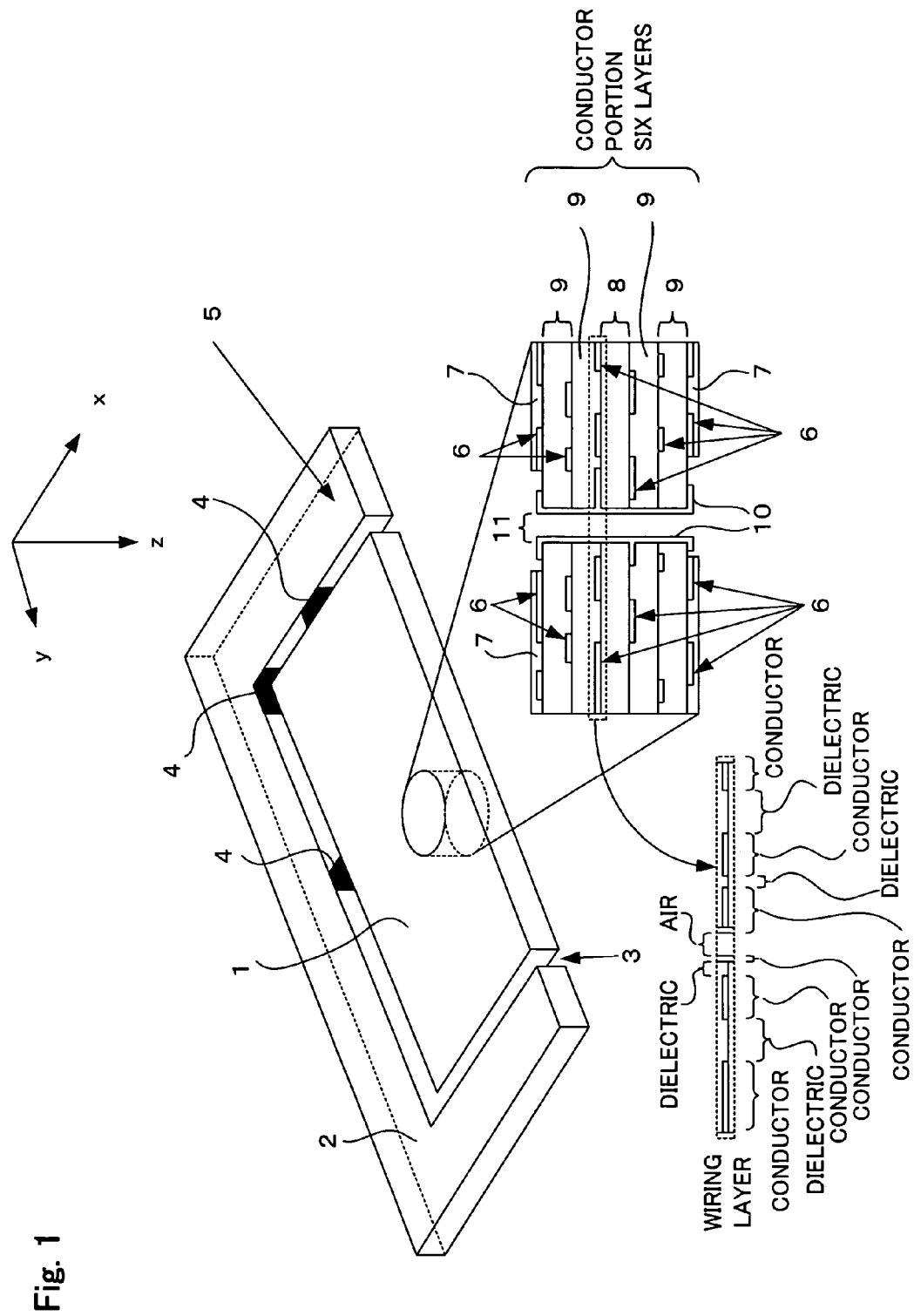
FIG. 1 illustrates a printed wiring substrate that is used in the embodiment of the present invention.

FIG. 1 illustrates the printed wiring substrate that is used in the embodiment of the present invention. The perimeter of the printed wiring substrate 1 is enclosed by a cut length 2. The printed wiring substrate 1 and cut length 2 are connected by ribs 4 and a groove 3 is formed at a point where no ribs 4 exist. The printed wiring substrate 1 and cut length 2 are separated by cutting the ribs 4.

The printed wiring substrate 1, rib 4, and cut length 2 are respectively composed of a multilayered structure. When copper extension lamination plates (core material 8 and copper foil 6) and prepregs 9 are arranged alternately and heat-pressed, the prepregs 9 exhibit a melt bond effect. A solder resist 7 coated to suppress the adhesion of solder is formed on the printed wiring substrate surface 5.

A via 11 is a hole whose inside wall is plated with plating 10 to connect different wiring layers. Thus, wiring layers are composed of the copper foil 6 (conductor), prepregs 9 (dielectric) and air in case where via 11 is present, or the like.

Figure 2:
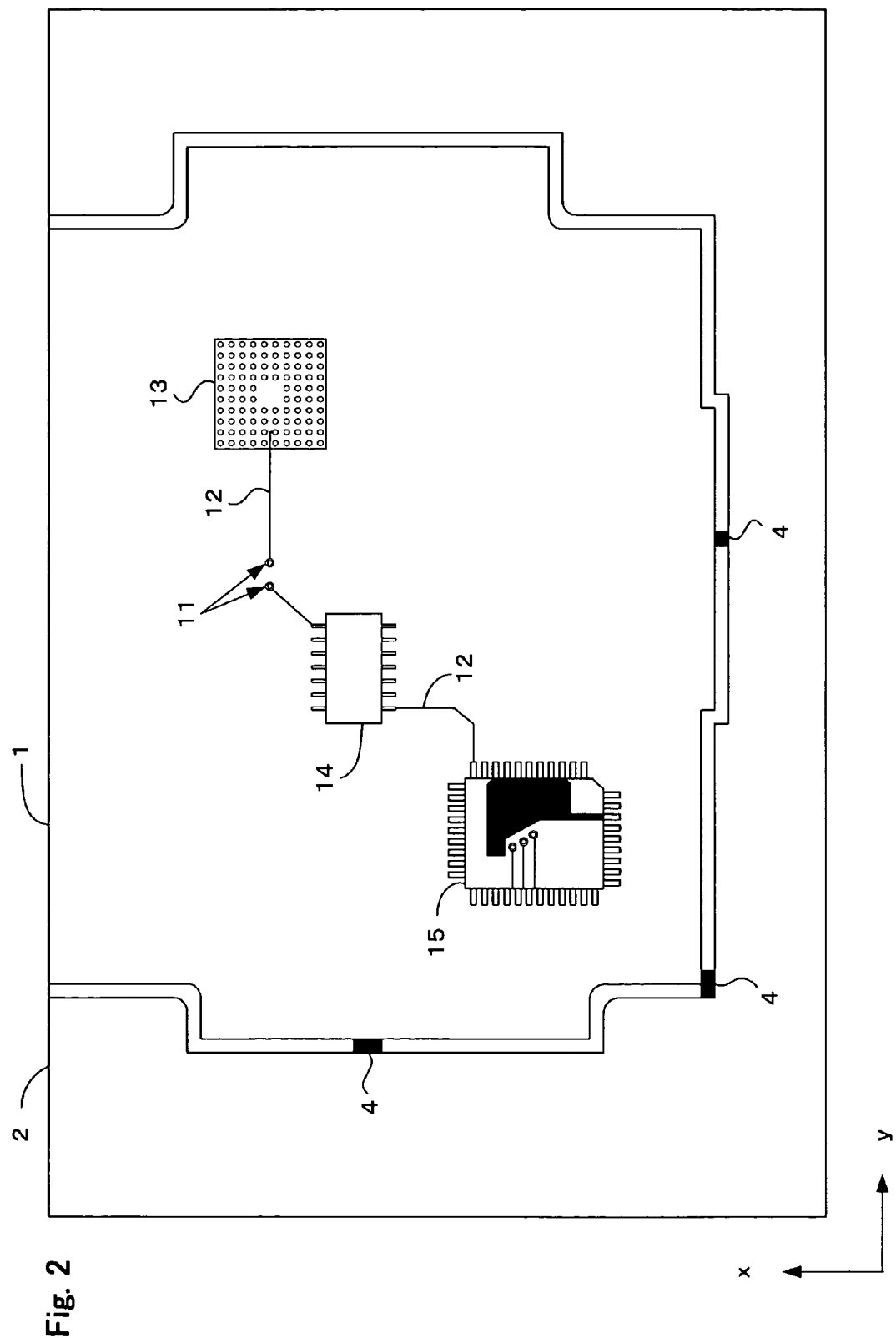
FIG. 2 illustrates the surface of the printed wiring substrate where the electronic parts are mounted.

FIG. 2 illustrates a surface 5 of the printed wiring substrate 1 where electronic parts are mounted. FIG. 2 shows the via 11, BGA (Ball Grid Array) support portion 13, SOP (Small Outline Package) support portion 14, QFP (Quad Flat Package) support portion 15, and so forth, and wiring 12 connecting the aforementioned parts is formed on the printed wiring substrate 1. The wiring and support portions for electronic parts in FIG. 2 shows part of the configuration. In reality, a greater number of electronic-part support portions are arranged than shown in FIG. 2 and complex wiring connecting the support portions is formed.

In the case of this embodiment, structural analysis in which the target of the analysis is the printed wiring substrate 1 shown in FIGS. 1 and 2 or a part that is produced by combining the printed wiring substrate 1 and cut length 2 is performed using a structural analysis device. Thereupon, the model used in the numerical-value simulation for the structural analysis is simplified by dividing up the analysis target into finite elements, defining a unit known as a mesh that brings together several finite elements, and assuming the material of the finite elements contained in the mesh as the conductor or other material based on the rate of content of the conductor 6 contained in the mesh, whereby it is possible to shorten the processing time and processing load of the structural analysis of the structural analysis device.

A threshold value that is set for content rate of the conductor is used in the assuming processing and a highly accurate simulation can be executed by setting this threshold value at a predetermined value beforehand. Further, by making the threshold value changeable, a more accurate simulation can be executed by changing the threshold value such that content rate of the conductor of the analysis target before performing the assuming processing and content rate of the conductor of the analysis target after the assuming processing are within a predetermined error range.

Figure 3:
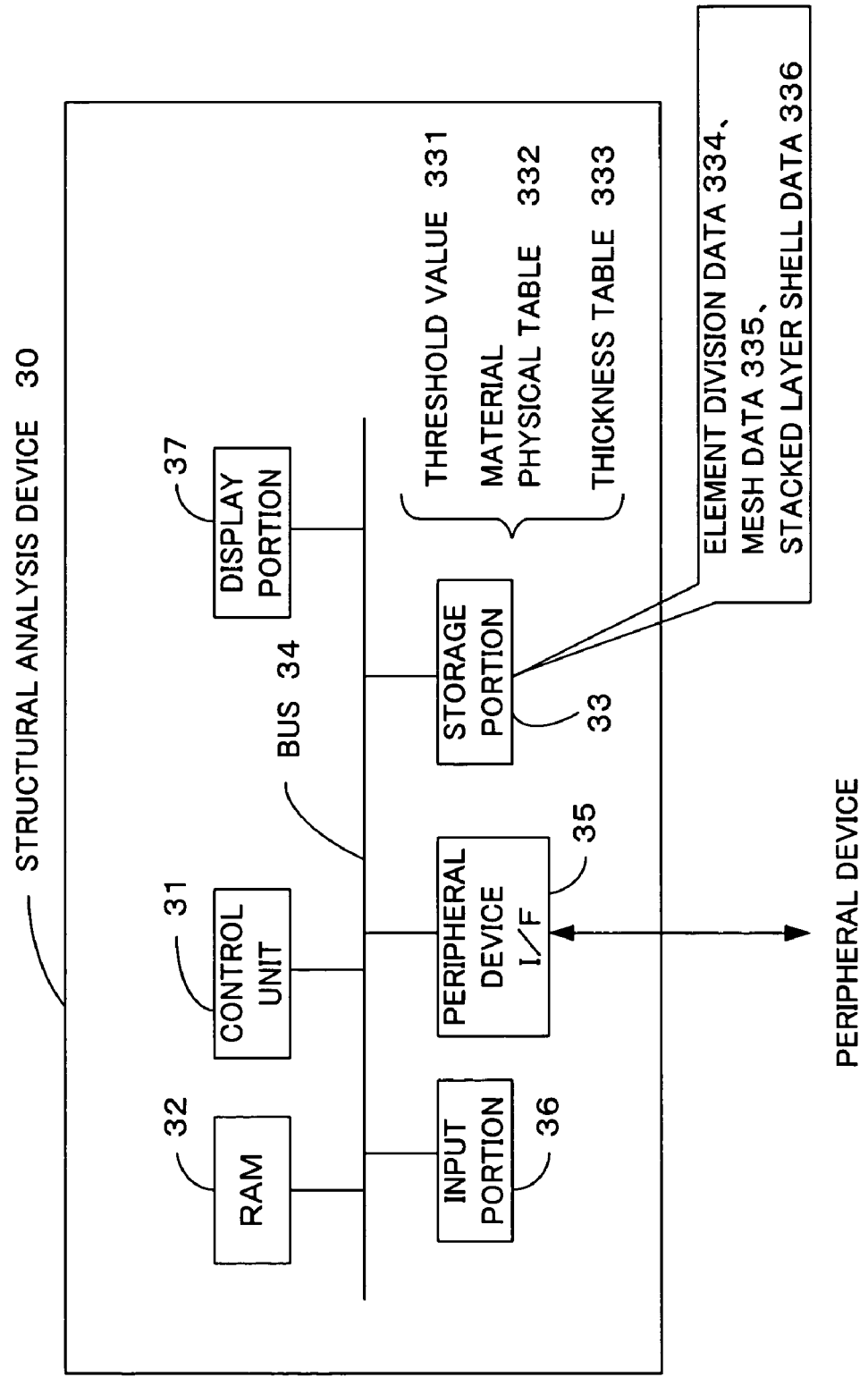
FIG. 3 illustrates the composition of the structural analysis device of the embodiment of the present invention.

FIG. 3 shows the composition of the structural analysis device 30 of the embodiment of the present invention. The structural analysis device 30 in FIG. 3 includes a control unit 31, a RAM (Random Access Memory) 32, a storage portion 33, a peripheral device connection interface (peripheral device I/F) 35, an input portion 36 for inputting information, and a display portion 37 for displaying information. These are mutually connected via a bus 34.

The control portion 31 comprises a CPU (Central Processing Unit) (not illustrated), executes a program that is stored in the RAM 32, and controls each part contained in the structural analysis device 30. The RAM 32 is storage means for temporarily storing computation results and programs of the processing by the structural analysis device 30. The storage portion 33 is nonvolatile storage means such as a hard disk, optical disk, magnetic disk, or flash memory that store various data and programs for the OS (Operating System) to be read to the RAM 32.

The peripheral device I/F 35 is an interface for connecting a peripheral device to the structural analysis device 30 that includes a parallel port, USB (Universal Serial Bus) port, PCI card slot and so forth. Peripheral devices are wide-ranging and include printers, TV tuners, SCSI (Small Computer System Interface) devices, audio devices, drives, memory card read/writers, network interface cards, wireless LAN cards, modem cards, keyboard and mouse, and display devices. The form of connection between the peripheral device and structural analysis device 30 may be wired or wireless.

The input portion 36 is input means for inputting an instruction request from a user such as a keyboard or mouse. The display portion 37 is display means for presenting information to the user such as CRT (cathode ray tube), a liquid-crystal display. The structural analysis device 30 can be executed by a desktop-type PC, notebook-type PC, PDA (Personal Digital Assistant), or server, or the like.

In this embodiment, a threshold value 331 for performing the assuming processing is pre-stored in the storage portion 33. The storage portion 33 also contains a material physical characteristic table 332 that associates materials contained in the analysis target with the physical characteristics thereof, and a thickness table 333 that associates points that are specified by two-dimensional coordinates xy coordinates in FIG. 1 or 2) formed on the surface 5 with the thickness in the thickness direction (z-axis direction shown in FIG. 1) of the analysis target.

Figure 4:
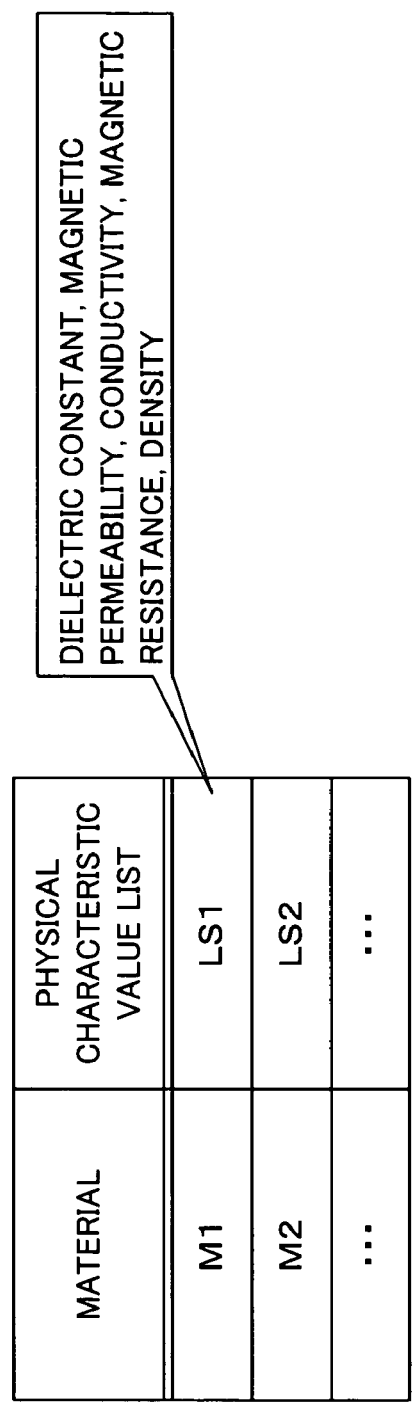
FIG. 4 shows an example of the data composition of a material characteristic table.

FIG. 4 shows an example of the data composition of a material physical characteristic table 332. The material physical characteristic table 332 in FIG. 4 contains data items known as 'materials' and 'physical-characteristic value list'. The 'materials' are material names specifying the constituent materials such as conductor, dielectric, and air being stored as values. The 'physical characteristic value list' is a list that links physical characteristic values specifying the physical characteristics of the material. The dielectric constant, magnetic permeability, conductivity, magnetic resistance, and density, and so forth, may be cited as items. If the material is specified by referencing the material physical characteristic table 332 in FIG. 4, the physical characteristic value may be obtained.

FIG. 5 shows an example of the data composition of a thickness table 333. The thickness table 333 in FIG. 5 contains data items such as 'positional information' and 'thickness'. 'Positional information' is information that specifies the position of a point on the surface 5 in FIG. 1 and is specified by the xy coordinates shown in FIG. 2, for example. 'Thickness' is a numerical value that indicates the thickness in the thickness direction (z-axis direction) in FIG. 1 of a position that is specified by 'positional information' by means of a proportion when the thickness of a printed wiring substrate 1 at the design stage is assumed to be 100%.

For example, supposing that, when the 'thickness' of the thickness data is 80%, the thickness at the design stage is 5 millimeters, the thickness at another point is normalized to 4 millimeters when used in the structural analysis. The designation of 'thickness' is not limited to a proportion and may also be a designation of length.

Thickness data is used in cases where measured data for the thickness of a finished product, for example, is reflected in the structural analysis. Alternatively, peculiarities that appear in the thickness of the finished product are ascertained when a certain fabrication line is passed and the thickness data is employed when performing a structural analysis that incorporates the peculiarities.

Thereafter, the operation of the structural analysis device 30 of this embodiment will be described.

Figure 6:
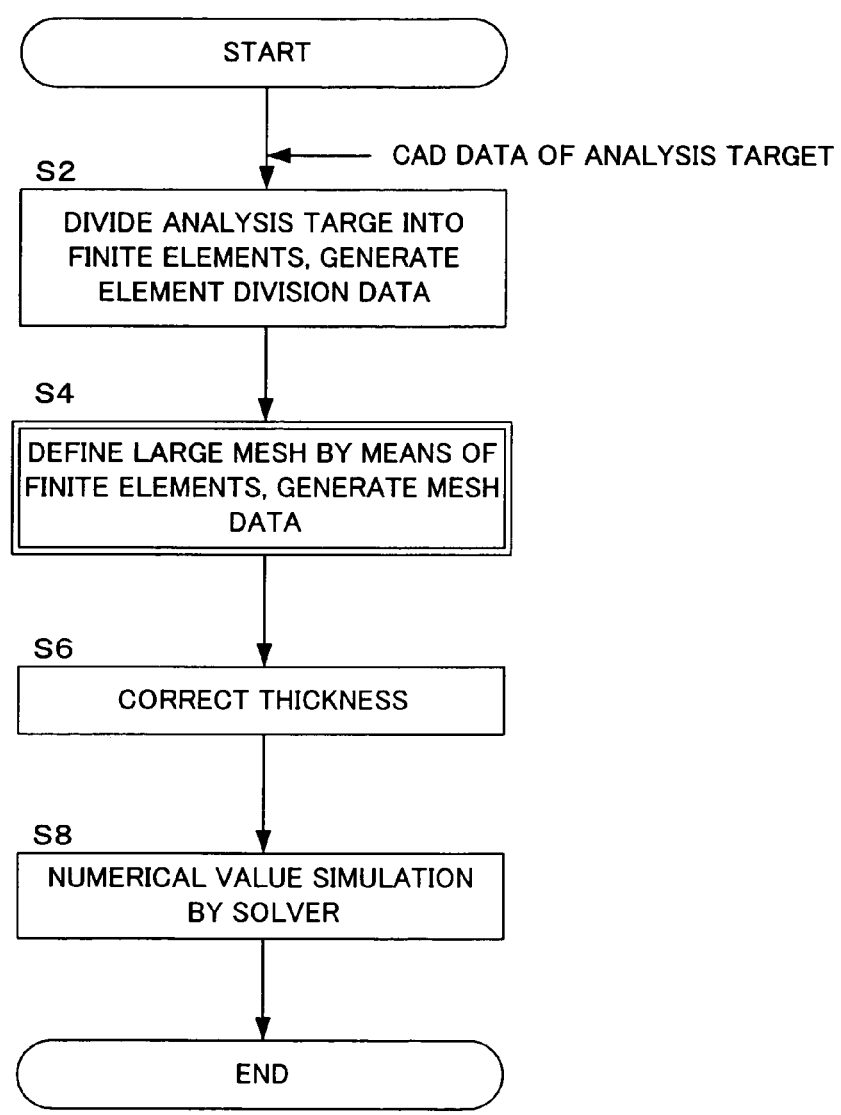
FIG. 6 is a flowchart illustrating the operation of a structural analysis device of the embodiment of the present invention.

FIG. 6 is a flowchart illustrating the operation of a structural analysis device 30 of the embodiment of the present invention. CAD (Computer Aided Design) data pre-specifying the formation of the analysis target is supplied to the structural analysis device 30. The structural analysis device 30 divides up the analysis target into finite elements and generates element division data 334, based on the CAD data thus supplied (S2). The element division data 334 thus generated is then stored in the storage portion 33.

In step S2, the structural analysis device 30 uses a cube as a finite element. For example, by inputting CAD-tool CAD data to Poynting, which is a commercial electrical-charge field, the printed wiring substrate 1 being the analysis target can be divided up into minute cubes.

Figures 7A, 7B:
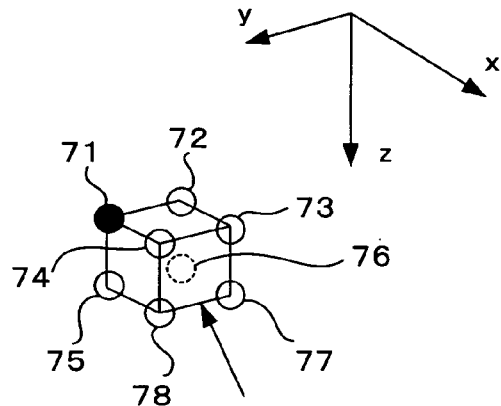
FIG. 7A shows a cube being a finite element.
FIG. 7B shows an example of the data composition of element division data.

FIG. 7A shows a cube being a finite element and FIG. 7B illustrates an example of the data composition of the element division data 334. The analysis target is divided up into the minute cubes 70 shown in FIG. 7A to an extent that allows the material of each finite element to be specified.

The position of each finite element is specified by specifying the coordinates of the corners of the cube 70, for example. The corners of the cube 70 are known as the nodes here and are divided into upper nodes (the first node 71 to fourth node 74) and lower nodes (fifth node 75 to eighth node 78) depending in the position in the thickness direction (z-axis direction).

The element division data 334 in FIG. 7B includes the 'element ID', 'layer number', the first to eighth 'nodes', and 'material' as data items. The 'element ID' is an identifier allocated to specify each finite element.

The 'layer number' is an identifier that specifies the 'layer' in which each finite element is contained. The thickness of one layer is the height of laying one of the cube 70 being the finite element. The layer to which a finite element belongs is, more specifically, specified by means of the z coordinate of the upper node of each finite element (first node, for example) and of the lower node (fifth node, for example). If this is expressed in terms of the relationship with the wiring layer shown in FIG. 1, there are cases where one wiring layer corresponds to the height produced by laying one finite element and cases where one wiring layer corresponds to the height of laying a plurality of finite elements.

The first to eighth 'nodes' indicate the coordinates specifying the corners of the cube 70 in FIG. 7A, which is a finite element. 'Material' is the material name specifying the constituent material of each element ('material' in the material table in FIG. 4). As shown in FIG. 7B, in cases where the same material is laid successively, there are cases where the material is the same even when the element ID is different. Further, the position of the finite element is specified not only by the corner coordinates of the cube 70 but also by a combination of the first node 71 (filled black circle in FIG. 7A) and the length of one side of the cube, for example.

Returning now to FIG. 6, when the processing of step S2 is complete, the structural analysis device 30 defines the mesh that divides the analysis target by means of units that are larger than the finite elements divided up in step S2 and generates mesh data 335 (S4). In step S4, the analysis target that is divided into finite elements is sliced into layers and projected onto a two-dimensional plane (xy coordinates in FIG. 1). A mesh is then defined for the two-dimensional plane and, when the proportion of the conductor occupying the mesh is equal to or more than a predetermined threshold value, the material of the whole finite element contained in the mesh is assumed the conductor. Thus assuming processing is executed.

Thereafter, when the mesh data 335 is generated, the structural analysis device 30 performs thickness correction by referencing the thickness table 333 (S6). As illustrated in FIG. 5, the 'thickness' in the thickness table 333 is a numerical value that indicates the thickness in the thickness direction (z-axis direction in FIG. 1z) in a position that is specified by 'positional information' by means of the proportion when the printed wiring substrate 1 at the design stage is assumed to be 100%. Here, as the processing in step S6, the structural analysis device 30 may calculate a numerical value weighted with the proportion specified by the 'thickness' for the length of the sides of the cube 70 as the thickness of each layer.

The structural analysis device 30 performs a structural analysis by using a variety of solver programs (rigidity equation solution) based on the mesh data generated by means of the processing above (also including cases where the thickness is corrected in step S6), (S8). By using a structural analysis solver, fluid analysis solver, or shock analysis solver, for example, as the solver program, for example, the structural analysis device 30 performs various analyses known as a thermal conduction analysis, thermal stress analysis or shock analysis for the printed wiring substrate.

Further, in the processing to generate the mesh data 335 in step S4 in FIG. 6, the structural analysis device 30 may calculate content rate of the conductor for each layer based on mesh data generated on one occasion and, for a layer in which the calculated content rate of the conductor exceeds a preset high-density reference value, may change the material of the finite element to a material other than a conductor in order to reduce content rate of the conductor and update the mesh data 335. In this processing, the conductor content that is calculated for each layer is adjusted to within a predetermined value range. Thus, the wiring density is balanced in each layer and the mesh model, which makes it possible to suppress warpage of the printed wiring substrate, can be employed in a structural analysis simulation.

Figure 8A:
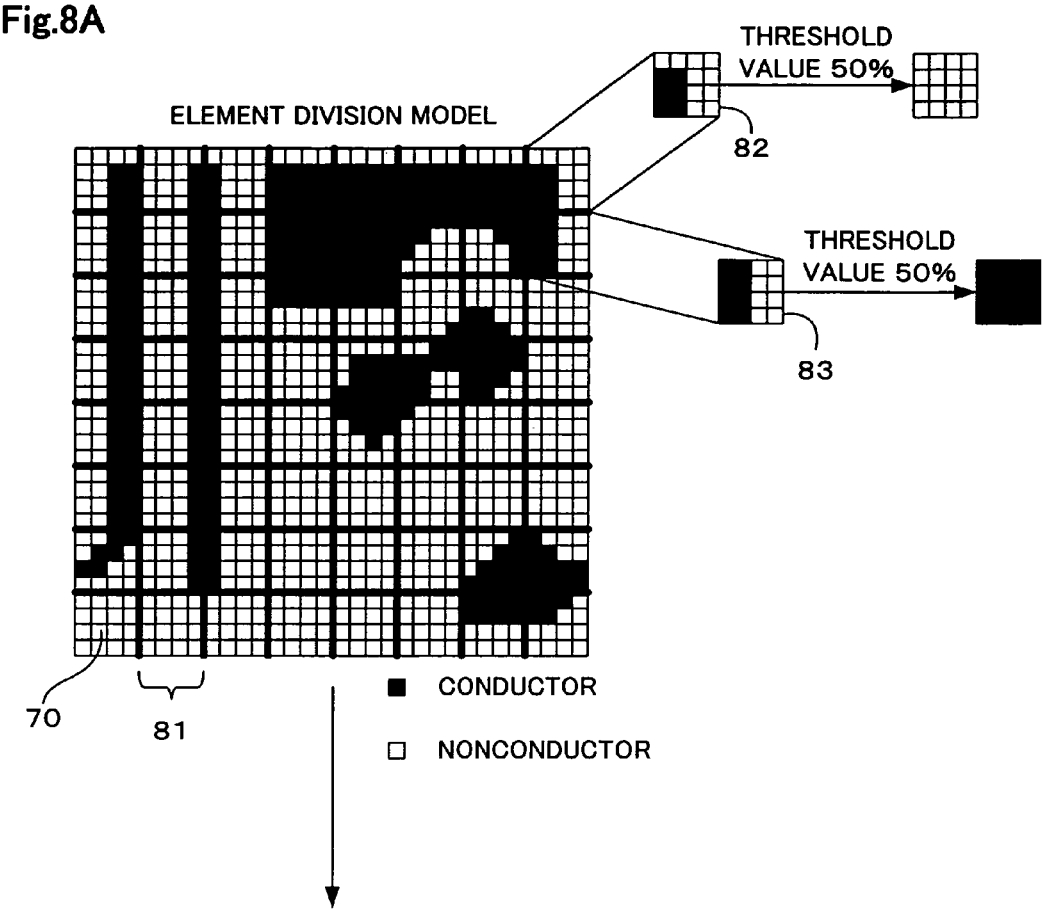
FIG. 8A is an element division model based on element division data and FIG. 8B shows a mesh model based on mesh data.
Figure 8B:
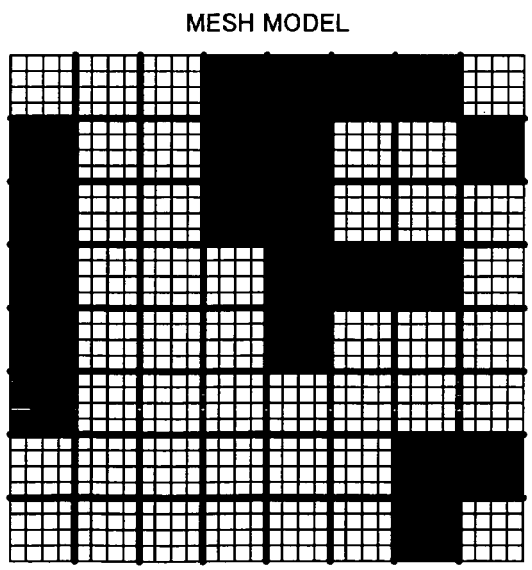

FIG. 8 illustrates an aspect in which the mesh data in step S4 in FIG. 6 is generated. FIG. 8A illustrates a mesh model based on the element division data 334 and FIG. 8B illustrates a mesh model based on mesh data.

The mesh 81 in FIG. 8 is defined as a square shape in which 4×4 finite elements are put in order. Further, the threshold value is set at 50% as an example. Further, a conductor is represented by a filled black square and a non-conductor is represented by a white square.

In the case of the element division model in FIG. 8A, the number of conductors among the sixteen finite elements is six in the mesh 82 in the top right-hand corner. Therefore, the conductor content of the mesh 82 is less than 50% and, in the processing of step S4, all the finite elements contained in the mesh 82 are regarded as being non-conductors (dielectrics, for example).

In the case of the mesh 83 below mesh 82, the number of conductors among the sixteen finite elements is eight. Therefore, the conductor content in mesh 83 is equal to or more than 50% and, in the processing of step S4, all the finite elements contained in the mesh 83 are regarded as being conductors. By performing the same processing, the mesh model (and corresponding mesh data) shown in FIG. 8B is generated.

Figure 9:
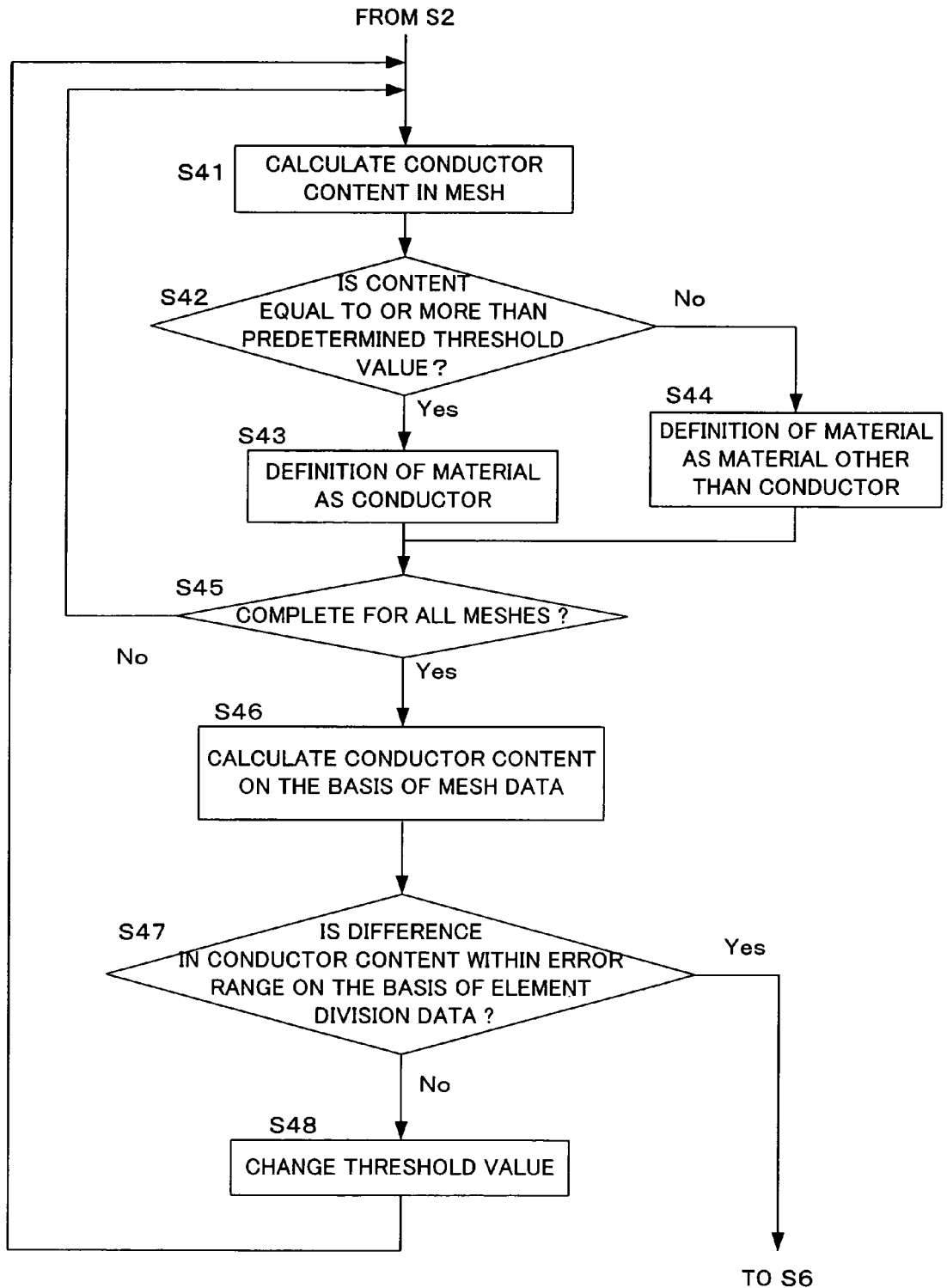
FIG. 9 is a flowchart illustrating mesh data generation processing.

FIG. 9 is a flowchart illustrating mesh data generation processing shown in step S4 in FIG. 8. The structural analysis device 30 calculates content rate of the conductor in the mesh (S41). The structural analysis device 30 defines the mesh by specifying the finite elements contained in the mesh, for example.

The element division data 334 in FIG. 7 may then be referenced and the proportion of finite elements the material of which is a conductor among the finite elements contained in each mesh may be calculated. A specific example is as shown in FIG. 8.

Thereafter, the structural analysis device 30 judges whether content rate of the conductor calculated in step S41 is equal to or more than a predetermined threshold value (S42). The predetermined threshold value is stored beforehand in the storage portion 33 as a threshold value 331 (for example, 50% or similar). When the calculated content rate of the conductor is equal to or more than a predetermined threshold value (Yes in S42), the structural analysis device 30 renders the material of the finite elements contained in the mesh 'conductor' (S43).

When content rate of the conductor thus calculated is less than a predetermined threshold value (No in S42), the structural analysis device 30 makes the material of the finite elements contained in the mesh a material other than 'conductor' (S44). For example, if there is a plurality of materials other than conductor, the material with the highest content of material other than conductor is selected. If there is only one material other than conductor, the material other than the conductor is selected.

Thus, as a result of the processing of steps S43 and S44, mesh data 335 is generated by substituting the 'material' of the finite element data generated in step S2 with conductor and non-conductor in accordance with content rate of the conductor in each mesh. Thus, the same materials occur in succession for the finite elements contained in the same mesh and, therefore, aggregate data may be mesh data as shown in the following drawing.

FIG. 10 is an example of the data composition of mesh data 335. The mesh data in FIG. 10 brings together the finite elements contained in the same mesh in one data entry and is no different from data in which the 'material' can be substituted in the element division data 334. However, the association with the mesh position information can be straightforward as a result of the data aggregation.

The mesh data in FIG. 10 includes data items such as the 'mesh ID', 'layer number', 'corresponding element list', first to fourth 'nodes', 'conductor content', and 'material'. The 'mesh ID' is an identifier that is allocated in order to specify each mesh.

The 'layer number' is an identifier that specifies the layer to which each mesh belongs. The 'corresponding element list' includes of a plurality of the 'element IDs' (see FIG. 7B) that specify the finite elements contained in the mesh.

The first to fourth 'nodes' indicate the coordinates specifying the corners of the mesh which is a square. The 'conductor content' is a numerical value showing the proportion of conductors among the finite elements contained in each mesh.

Further, the 'material' is the material name ('material' in the material table in FIG. 4) that specifies the constituent material of each mesh. The determination of the constituent material of the mesh is illustrated in steps S43 and S44 in FIGS. 8 and 9.

Returning now to FIG. 9, when the processing of steps S43 and S44 is complete, the structural analysis device 30 judges whether the processing from step S41 to S44 is finished for all the meshes (S45). If an unprocessed mesh exists (No in S45), the processing resumes by returning to step S41.

When the processing from step S41 to S44 has finished for all the meshes (Yes in S45), the structural analysis device 30 calculates content rate of the conductor of each layer on the basis of the mesh data 335. Thus, the conductor content in the mesh model after the assuming processing shown in FIG. 8B is calculated.

Further, the structural analysis device 30 calculates content rate of the conductor of each layer on the basis of the element division data 334 and compares same with the conductor content calculated in step S46 (S47). The conductor content based on the element division data 334 is content rate of the conductor in the element division model prior to the assuming processing shown in FIG. 8A.

When the difference between content rate of the conductor before and after the assuming processing is within a predetermined error range (Yes in S47), the mesh data generation processing ends and the processing for step S6 of a subsequent stage progresses. The error range that is employed in step S47 is pre-stored in the storage portion 33.

When the difference between content rate of the conductor before and after the assuming processing is not within the predetermined error range (No in S47), the structural analysis device 30 changes the predetermined threshold value 331 stored in the storage portion 33 (S48). For example, if content rate of the conductor in the mesh model is greater than content rate of the conductor of the element division model, the structural analysis device 30 raises the threshold value. By raising the threshold, the proportion of conductors in the mesh model may be decreased. In the opposite case, the structural analysis device 30 lowers the threshold value and the proportion of conductors in the mesh model may be increased. When the processing of step S48 is complete, the processing is performed by returning to step S41.

Although mesh data 335 is generated in the flowchart illustrated in FIG. 6, the structural analysis device 30 may automatically generate stacked layer shell data 336, the data size of which is further compressed, from the mesh data. For example, the structural analysis device 30 performs stacked layer shell data generation processing shown in the following drawing between steps S4 and S6 in FIG. 6.

Figure 11:
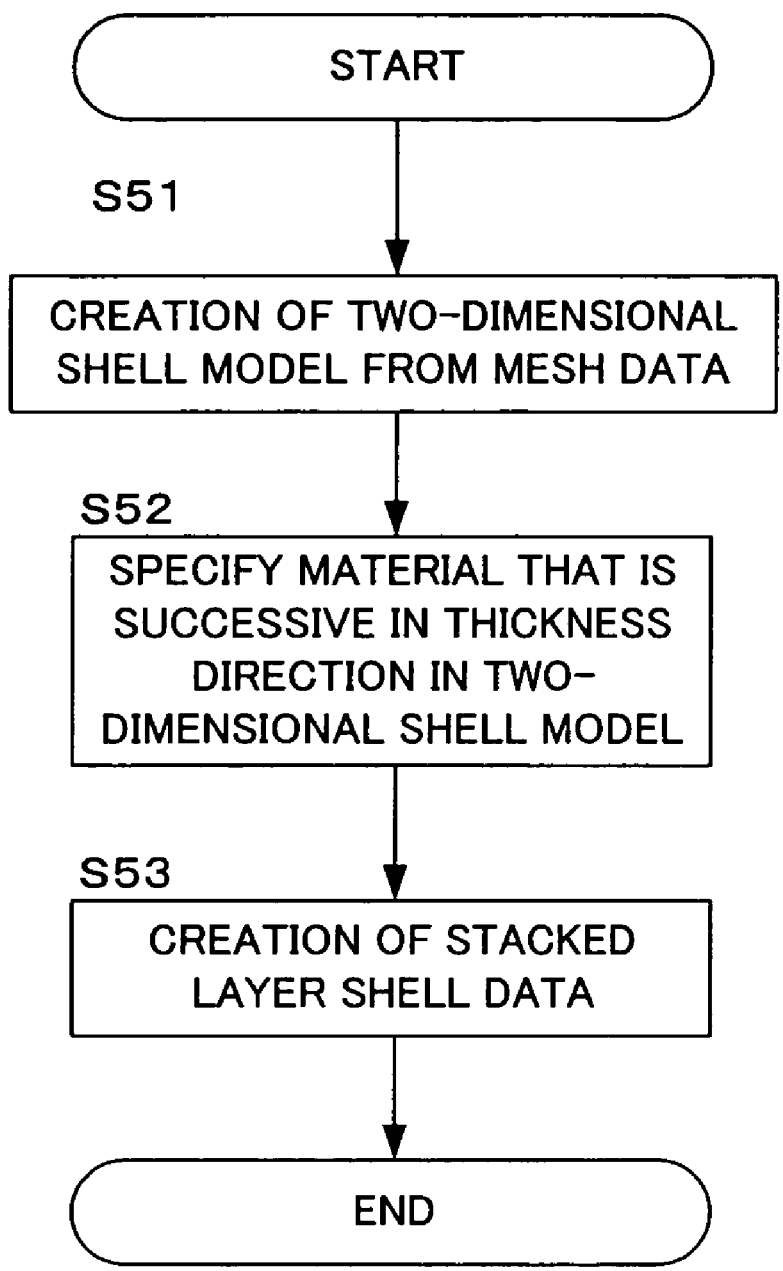
FIG. 11 is a flowchart illustrating processing to generate stacked layer shell data from mesh data.

FIG. 11 is a flowchart illustrating processing to generate stacked layer shell data from mesh data. The structural analysis device 30 creates a two-dimensional shell model from the mesh data 335 (S51). The two-dimensional model is created by specifying meshes with two-dimensional coordinates for which the first to fourth nodes are the same in different layers and by putting in order starting from the mesh with the smallest z-axis coordinate value. That is, overlapping meshes are put in order when each layer is projected on an xy plane.

Further, the structural analysis device 30 specifies successive materials in the thickness direction for each mesh brought together in the two-dimensional mesh model (S52). The structural analysis device 30 then calculates the thickness of each material depending on how many successive layers there are for each material and generates the stacked layer shell data 336 (S53).

FIG. 12 is an example of the data composition of stacked layer mesh data. The mesh data in FIG. 12 includes data items such as the 'two-dimensional mesh ID', first to fourth 'nodes' and 'material and thickness list'.

The 'two-dimensional mesh ID' is an identifier that specifies a mesh that can be specified by the same nodes when meshes that exist in a layer shape in the thickness direction (z-axis direction in FIG. 1) is projected onto a two-dimensional plane (xy-axis direction in FIG. 1). The first to fourth 'nodes' indicate the coordinates specifying the corners of the two-dimensional mesh which is a square.

The 'material and thickness list' is a list that pairs the successive materials in the thickness direction with the thickness. The thickness may be the actual length or the number of successive layers. In the latter case, if the side length of the cube body 70 is known, the actual length can be computed based on the number of successive layers.

When the stacked layer shell data 336 shown in FIG. 12 is used, in the correction processing to correct the thickness in step S6 in FIG. 6, the thickness of each material in the 'materials and thickness list' is multiplied by the proportion of the 'thickness' (see thickness table 333 in FIG. 5) in a position at the center of the mesh, for example. For example, when the thickness in the middle position of a mesh the two-dimensional mesh ID in FIG. 12 of which is 1 is set at 80%, a numerical value rendered by multiplying thickness T11 corresponding with the material M1 by 0.8 is corrected as the thickness of the material M1 in step S6 in FIG. 6. Similar processing is also performed on the other materials M2 and M3 contained in the mesh the two-dimensional mesh ID of which is 1.

Figure 13:
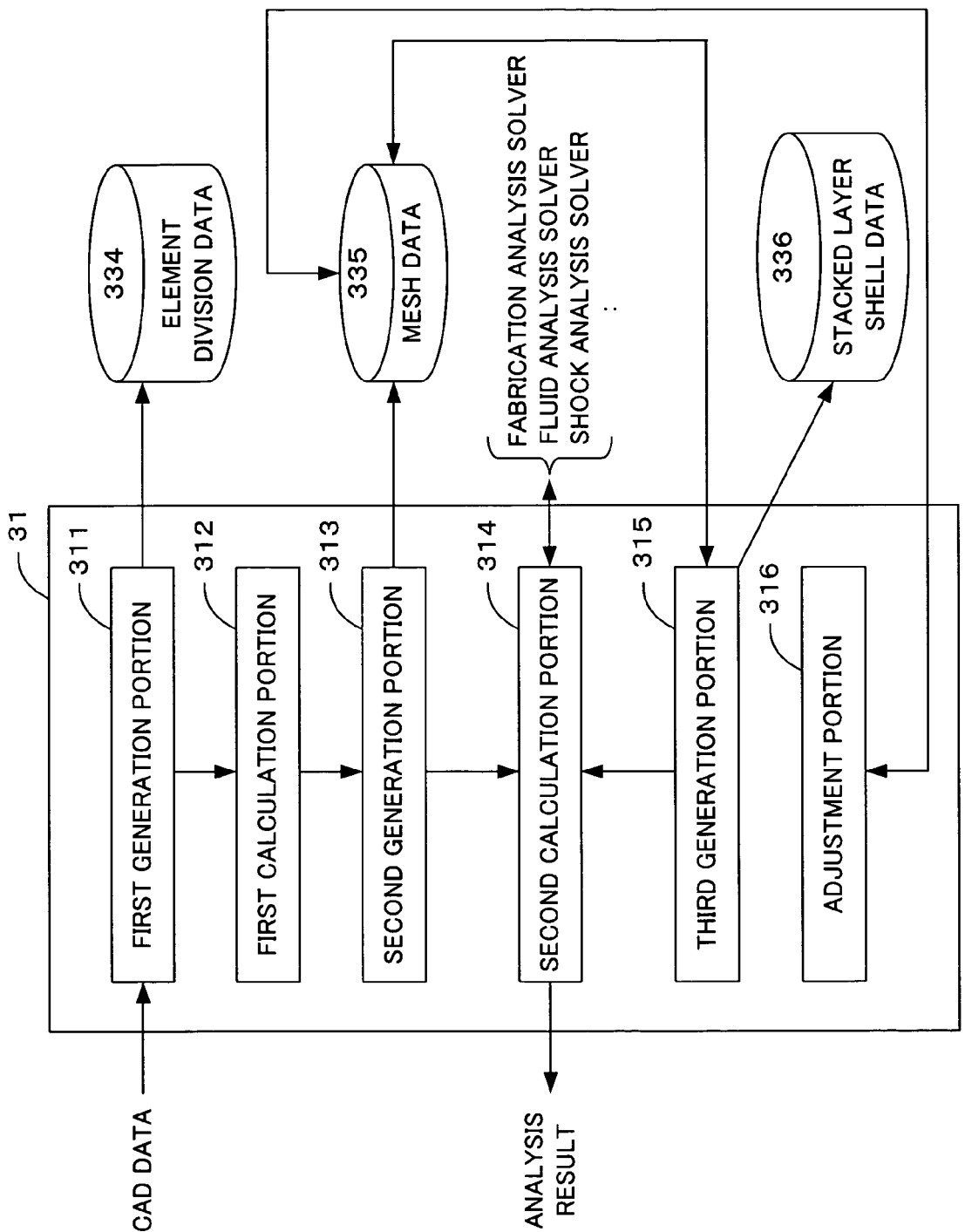
FIG. 13 is a functional block diagram of a structural analysis device 30 of the embodiment of the present invention.

FIG. 13 is a functional block diagram of the structural analysis device 30 of the embodiment of the present invention. The control unit 31 of the structural analysis device 30 has a first generation portion 311, a first calculation portion 312, a second generation portion 313, a second calculation portion 314, a third generation portion 315, and an adjustment portion 316. Each functional portion of the control unit 31 is implemented as a program that is executed by a CPU (not illustrated) that the control unit 31 includes but can also be implemented by hardware.

The first generation portion 311 divides the analysis target into a plurality of finite elements and generates the element division data 334 that associates the positions of finite elements with materials. The first calculation portion 312 defines a plurality of meshes that divide the analysis target into units larger than the finite elements and calculates the conductor content contained in the mesh on the basis of element division data for each mesh.

The second generation portion 313 specifies meshes the calculated content rate of the conductor of which exceeds a predetermined threshold value and generates mesh data 335 that makes it possible to substitute, in the material information of the element division data, the material of the finite element contained in the specified mesh as conductor. The second calculation portion 314 uses various solvers to calculate the physical amounts produced in the analysis target on the basis of the mesh data and outputs the analysis target.

Further, the structural analysis device 30 may contain a third generation portion 316 for generating stacked layer shell data 336 that associates successive materials and the thickness of the successive materials with a mesh position by specifying successive sections of the same material in the thickness direction of the mesh with the same two-dimensional coordinates from the mash data. In this case, the second calculation portion 314 is able to transfer stacked layer shell data generated by the third generation portion 136 to various solvers and perform a structural analysis.

Furthermore, the structural analysis device 30 may include an adjustment portion 316 that calculates content rate of the conductor of each layer on the basis of the mesh data 335, and performs an adjustment so that content rate of the conductor thus calculated for each layer lies within a predetermined value range by changing the material of the finite elements to a material other than a conductor in order to reduce content rate of the conductor in layers in which the calculated content rate of the conductor exceeds a high density reference value.

In the foregoing description, a case in which structural analysis of a printed wiring substrate 1 was performed was described. However, this embodiment can also be applied to a case where a structural analysis of an object produced by combining the printed wiring substrate 1 and cut length 2 is performed. Further, this embodiment can also be applied to a case where a structural analysis is performed by extracting part of the printed wiring substrate 1 and cut length 2.

FIG. 14 illustrates an aspect for performing structural analysis by extracting part of the printed wiring substrate 1. In FIG. 14, a screen 141 showing the results of performing an analysis of the stress at a predetermined temperature by extracting the BGA support portion 13 shown in FIG. 2 is rendered. For example, region 142 is a region classified as a location where warpage is large.

The structural analysis device 30 of this embodiment is also able to perform an analysis that employs the electronic parts mounted on the printed wiring substrate 1 as the analysis target. For example, as shown in FIG. 14, this embodiment is also applied to the structural analysis of the BGA 143 that is mounted on the BGA support portion 13. Furthermore, in this case, the mesh formed on the BGA 143 can have the same placement as the BGA support portion 13 for mounting the BGA 143. It is also possible to easily perform a structural analysis of the printed wiring substrate when electronic parts are mounted by applying simple constraint conditions and environment conditions, and so forth, at the time of the analysis by various solvers, by making the mesh definition the same on the electronic part side and the electronic-part mounting side.

According to the embodiment described above, the structural analysis device 30 is able to automatically generate mesh data from CAD data specifying the shape of the printed wiring substrate to a structural analysis solver. Further, the generated mesh data is simplified (compressed) so that a mesh unit carries a single material characteristic. Therefore, the structural analysis device 30 is able to execute the computation required for a structural analysis in a shorter time and with a lower load than conventional technologies for specifying material characteristics for each finite element contained in the mesh.

Further, the structural analysis device 30 is able to compare content rate of the conductor before and after simplification (assuming processing) for each layer and change the threshold value used in the assuming processing to within a predetermined error range, whereby a drop in the prediction accuracy as a result of simplification is prevented. The structural analysis device 30 is also able to perform structural analysis by extracting part of the printed wiring substrate.

Moreover, the structural analysis device 30 defines the same mesh for the electronic parts mounted on the printed wiring substrate and the parts that receive the electronic parts on the substrate side, whereby warpage due to heat and press in the process of mounting the electronic parts on the printed wiring substrate can be accurately predicted in a short time and the results of countermeasures to reduce the warpage can be investigated beforehand. The same analysis is also possible for the cut length and the structural analysis device 30 can also perform predictions of warpage and so forth in the fabrication process for the printed wiring substrate.

Thus the present invention enables to provide a structural analysis method that saves analysis time without lowering the prediction accuracy.

What is claimed is:

1. A structural analysis method that is executed by a structural analysis device that performs a structural analysis of an analysis target that is formed from a plurality of materials with different physical properties, comprising:

generating at the structural analysis device, upon dividing up the analysis target into a plurality of finite elements, element division data that associates positional information specifying a position of the finite element and material information specifying a material of the finite element, for each of the finite elements;

defining at the structural analysis device a plurality of meshes that divide up the analysis target into units larger than the finite elements by means of positional information and calculating, for each mesh, a content rate of a conductor among the plurality of materials that occupy the finite element contained in the mesh on the basis of the element division data;

substituting the material information in the mesh for the material information more than a prescribed ratio, if the content rate of the conductor in the mesh is more than the prescribed ratio; and calculating at the structural analysis device the physical amount yielded in the analysis target on the basis of the generated mesh data.

2. The structural analysis method according to claim 1, further comprising:

obtaining at the structural analysis device a first content rate of the conductor occupying the analysis target that is calculated on the basis of the element division data and a second content rate of the conductor occupying the analysis target that is calculated on the basis of the generated mesh data; and regenerating at the structural analysis device the mesh data by changing the predetermined threshold value when the first and second content rates do not lie within a predetermined error range.

3. The structural analysis method according to claim 1 or 2, wherein a plurality of layers are formed in the analysis target according to the division into the finite elements, wherein the method further comprises extracting at the structural analysis device, for each of the layers, the position corresponding with a predetermined region of the surface of the analysis target, and wherein the mesh is defined with respect to the extracted position.

4. The structural analysis method according to claim 1 or 2, wherein a plurality of layers are formed in the analysis target according to the division into the finite elements, and wherein the method further comprises:

getting at the structural analysis device, for each of the layers, the content rate of the conductor occupying the analysis target on the basis of the generated mesh data; and changing at the structural analysis device, in the layer in which the got content rate of the conductor exceeds a high density reference value, material information of a predetermined finite element contained in the mesh data to material information of a material other than the one-material conductor among a plurality of materials forming the analysis target; and performing an adjustment so that the got proportion of the one material content rate of the conductor for each of the layers lies within a predetermined error range.

5. The structural analysis method according to claim 1 or 2, further comprising:

forming at the structural analysis device new mesh data when a member that is added to a predetermined region of the surface of the analysis target is a new analysis target, wherein the mesh position of the added member and the mesh position of the predetermined region of the surface of the analysis target receiving the added member match.

6. The structural analysis method according to claim 1 or 2, further comprising:

specifying at the mesh positional information by means of three-dimensional coordinates rendered by combining two-dimensional coordinates formed on the surface of the analysis target and the position in a thickness direction that is orthogonal to the surface; and creating at the structural analysis device, by specifying successive sections of the common material in the thickness direction of the mesh with the common two-dimensional coordinates, on the basis of the mesh data, stacked layer shell data associating the material information of the successive material and the thickness of the successive material with the mesh positional information, wherein the physical amount yielded in the analysis target is calculated on the basis of the stacked layer shell data.

7. The structural analysis method according to claim 1 or 2, wherein a plurality of layers are formed in the analysis target according to the division into the finite elements, wherein the structural analysis device has a storage portion for pre-storing thickness data that associates the position of the surface of the analysis target and the thickness in the layer direction of the analysis target of the multi-layered structure, and wherein the method further comprises updating at the structural analysis device the mesh data on the basis of the thickness data.

8. A program allowing a computer that performs a structural analysis of an analysis target formed by a plurality of materials with different physical characteristics to execute:

generating at the structural analysis device, upon dividing up the analysis target into a plurality of finite elements, element division data that associates positional information specifying a position of the finite element and material information specifying a material of the finite element, for each of the finite elements;

defining at the structural analysis device a plurality of meshes that divide up the analysis target into units larger than the finite elements by means of positional information and calculating, for each mesh, a content rate of a conductor among the plurality of materials that occupy the finite element contained in the mesh on the basis of the element division data;

substituting the material information in the mesh for the material information more than a prescribed ratio, if the content rate of the conductor in the mesh is more than the prescribed ratio; and calculating at the structural analysis device the physical amount yielded in the analysis target on the basis of the generated mesh data.

9. A structural analysis device that performs a structural analysis of an analysis target formed from a plurality of materials with different characteristics, comprising:

a storage portion having a control program; and a control unit that reads and executes the control program, wherein the control unit implements, by executing the control program, a first generation portion that generates, upon dividing up the analysis target into a plurality of finite elements, element division data that associates positional information specifying a position of the finite element and material information specifying a material of the finite element, for each of the finite elements;

a first calculation portion that defines a plurality of meshes that divide up the analysis target into units larger than the finite elements by means of positional information and calculates, for each mesh, a content rate of a conductor among the plurality of materials that occupy the finite element contained in the mesh on the basis of the element division data;

a second generation portion that substitutes the material information in the mesh for the material information more than a prescribed ratio, if the content rate of the conductor in the mesh is more than a prescribed rate; and a second calculation portion that calculates the physical amount yielded in the analysis target on the basis of the mesh data thus generated.

10. The structural analysis device according to claim 9, wherein the first calculation portion further calculates a first content rate of the conductor occupying the analysis target that is calculated on the basis of the element division data and a second content rate of the conductor occupying the analysis target that is calculated on the basis of the generated mesh data; and the second generation portion regenerates the mesh data by changing the predetermined threshold value when the first and second content rates do not lie within a predetermined error range.

11. The structural analysis device according to claim 9 or 10, wherein a plurality of layers are formed in the analysis target according to the division into the finite elements, wherein the first generation portion generates the element division data by extracting, for each of the layers, a position corresponding with a predetermined region of the surface of the analysis target, and wherein the first calculation portion defines the mesh with respect to the region thus extracted.

12. The structural analysis device according to claim 9 or 10, wherein a plurality of layers are formed in the analysis target according to the division into the finite elements, and wherein the device further comprises an adjustment portion that:

calculates, for each of the layers, the content rate of the conductor occupying the analysis target on the basis of the generated mesh data;

changes, in the layer in which the calculated content rate of the conductor exceeds a high density reference value, material information of a predetermined finite element contained in the mesh data to material information of a material other than the conductor among a plurality of materials forming the analysis target; and performs an adjustment so that the content rate of the conductor calculated for each of the layers lies within a predetermined error range.

13. The structural analysis device according to claim 9 or 10, wherein the first calculation portion further generates new mesh data when a member that is added to a predetermined region of the surface of the analysis target is a new analysis target, and wherein the mesh position of the added member and the mesh position of the predetermined region of the surface of the analysis target receiving the added member match.

14. The structural analysis device according to claim 9 or 10, wherein the mesh positional information is specified by means of three-dimensional coordinates rendered by combining two-dimensional coordinates formed on the surface of the analysis target and the position in a thickness direction that is orthogonal to the surface, wherein the device further comprises:

a third generation portion which, by specifying successive sections of the common material in the thickness direction of the mesh with the common two-dimensional coordinates, generates, on the basis of the mesh data, stacked layer shell data associating the material information of the successive material and the thickness of the successive material with the mesh positional information; and the second generation portion calculates the physical amount yielded in the analysis target on the basis of the stacked layer shell data.

15. The structural analysis device according to claim 9 or 10, wherein a plurality of layers are formed in the analysis target according to the division into the finite elements, wherein thickness data that associates the position of the surface of the analysis target and the thickness in the layer direction of the analysis target of the multi-layered structure is pre-stored in the storage portion, and wherein the second generation portion updates the mesh data on the basis of the thickness data.

* * * * *

UNITED STATES PATENT AND TRADEMARK OFFICE
CERTIFICATE OF CORRECTION

PATENT NO.        : 7,730,444 B2                                    Page 1 of 1
APPLICATION NO. : 11/259272
DATED             : June 1, 2010
INVENTOR(S)       : Nobutaka Itoh et al.

It is certified that error appears in the above-identified patent and that said Letters Patent is hereby corrected as shown below:

Column 13, Line 42-43 after "other than the" delete "one-material".

Column 13, Line 45-46 after "the got" delete "proportion of the one material".

Signed and Sealed this

Twenty-third Day of November, 2010

David J. Kappos
*Director of the United States Patent and Trademark Office*